Patented Nov. 6, 1934

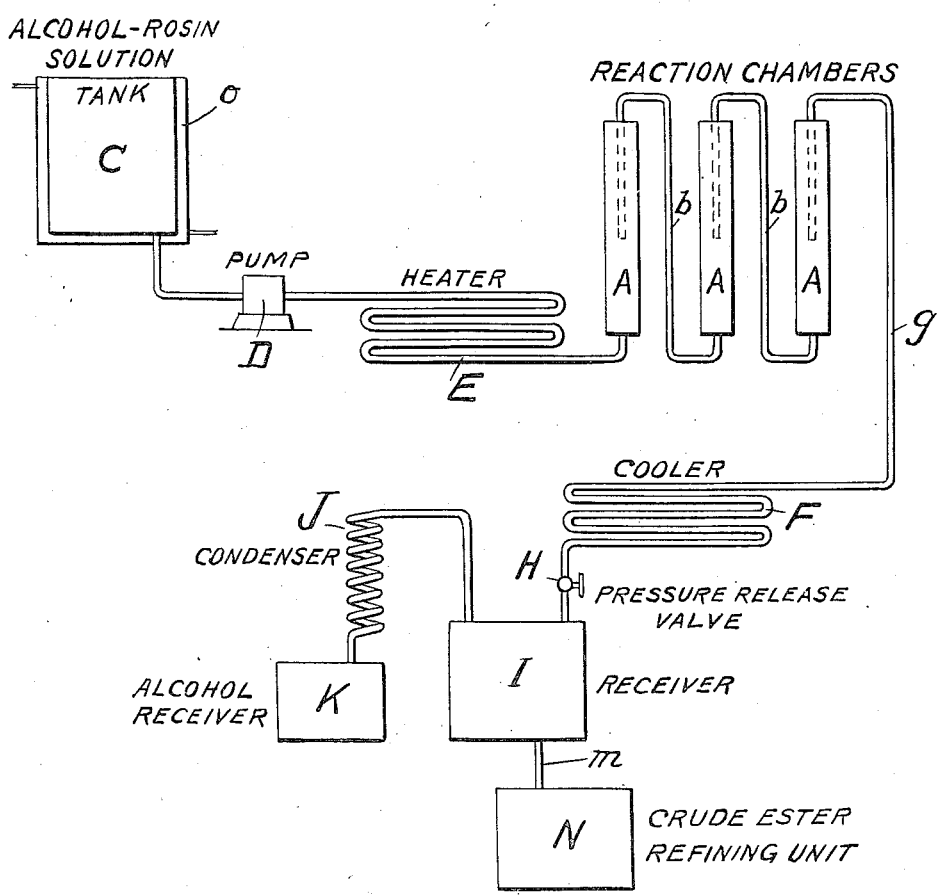

1,979,671

UNITED STATES PATENT OFFICE 1,979,671

METHOD FOR THE PRODUCTION OF ROSIN ESTERS

Durain C. Butts, Sandusky, Ohio, assignor to Hercules Powder Company, Wilmington, Del., a corporation of Delaware Application January 6, 1932, Serial No. 584,945

30 Claims. (Cl. 260—99.40)

This invention relates to a method for the production of rosin esters and more particularly relates to a method whereby rosin esters of monohydric aliphatic alcohols may be produced by continuous esterifications.

Heretofore the direct production of abietic acid esters of monohydric aliphatic alcohols such as methyl, ethyl, propyl, butyl, amyl, the isomers of the three latter alcohols and of polyhydric alcohols, as glycerol, a glycol, as ethylene glycol, glycol monoethers as ethylene glycol monomethyl ether, propylene glycol monoethyl ether, etc. has presented a problem of substantial difficulty and such esters have only been produced by batch methods and at substantial expense. Generally, in the production of such esters, relatively high temperatures and pressures and the use of an esterification catalyst is required.

The methods for the direct production of abietic acid or rosin esters of monohydric aliphatic alcohols and of polyhydric alcohols heretofore known have been more particularly objectionable because of the relatively long time required to obtain efficient yield, loss arising from decomposition of rosin, requirement for relatively large excess of alcohol to rosin and loss arising from decomposition or hydrolysis of ester product and from the necessity for the use of acid catalysts with monohydric alcohols which produce corrosion of apparatus and cause decomposition of rosin.

Now, in accordance with this invention a method is provided by which the production of abietic acid or rosin esters of monohydric aliphatic alcohols, as methyl, ethyl, propyl, butyl, amyl, etc. the isomers of the three latter alcohols, and of polyhydric alcohols, as glycerol, a glycol, as ethylene glycol, etc. may be produced continuously and with facility and economy over prior methods, and without necessarily the use of a catalyst, thus avoiding corrosion of apparatus and decomposition of rosin as heretofore with the use of acid catalysts.

The method in accordance with this invention enables an efficient yield of ester to be obtained with great reduction in the time factor, at lower temperature and pressure with the use of a smaller excess of alcohol, and without any substantial decomposition of rosin or of the ester product.

In the practical adaptation of the method embodying this invention for obtaining, for example, a yield of 80–95%, monohydric alcohols and either abietic acid or rosin may be used in a molar ratio of about 3–25 to one, preferentially about 6–15 to one. The temperature of treatment to effect the esterification may be within about the range 225° C.–360° C., preferentially about 260° C.–290° C. and it will often be found advantageous to proceed at a temperature above the critical temperature of the alcohol. The treatment may be carried out under a pressure of from about 200 to 3500 pounds, depending upon the proportion of alcohol to abietic acid or rosin used, temperature and the desired time factor, though generally 1200–2000 pounds will be sufficient. The reaction period, depending upon various conditions, including temperature, pressure, proportion of alcohol, etc. will usually involve from about 5–30 minutes.

In the practical adaptation of this invention wherein a polyhydric alcohol, as for example, glycerol, a glycol, is used, the rosin or abietic acid and polyhydric alcohol will be heated to facilitate solution or partial solution of the rosin or abietic acid in the alcohol and the polyhydric alcohol.

The esterification may be carried out at a temperature, for example, within about the range 240°–300° C.; preferably within about the range 260–280° C., and may be carried out at a pressure from about slightly below atmospheric, to facilitate the removal of water, up to 200 pounds per square inch or more. The reaction period will vary depending upon conditions of pressure, temperature, molar proportions, etc., but will usually require about 15–60 minutes.

Having indicated, in a general way, the nature and purpose of this invention, the practical carrying out of the method will be described in connection with description of the apparatus with reference to the accompanying drawing.

In the accompanying drawing the single figure illustrates diagrammatically the form of apparatus adapted for use in the efficient carrying out of the method embodying the invention.

In the drawing, A, A indicates a series of reaction chambers connected by means of pipes b. The pipes b afford communication from a point below the top of one reaction chamber to the bottom of the adjacent reaction chamber. The reaction chambers may be heated for maintenance of the desired reaction temperature at which, as will be seen, the abietic acid or rosin and alcohol are introduced into the chambers, in any suitable manner, as for example, by the circulation of a heating medium through jackets about the chamber or through coils contained within the chambers.

C indicates a tank for containing alcohol and either abietic acid or rosin to be charged into the reaction chambers. The tank C is heated by a heating medium circulated through a jacket o in order to increase the solubility of the rosin. The proper proportions of alcohol with either abietic acid or rosin in the form of a solution are introduced into the tank C or separately with formation of a solution therein. D is a pump by which alcohol-rosin solution is passed into and through the reaction chambers. E is a preheater through which the alcohol-rosin solution is pumped to bring it to a reaction temperature and from which it passes into the reaction chamber.

F is a cooler connected with the last of the series of reaction chambers by means of a pipe g into which the crude ester and excess alcohol is discharged from the last reaction chamber. H is a pressure release valve through which the crude ester and excess alcohol pass from the cooler into a receiver I.

From the receiver I the alcohol, which is in vapor phase, passes into a condenser J in which it is condensed and from which the liquid alcohol passes into an alcohol receiver K. From the receiver I the crude ester may be withdrawn, or it may be passed through pipe m into a refining unit N, in which it may be refined in any desired manner, as for example, by distilling under reduced pressure in the presence of soda ash, or other suitable fixed alkali which will combine with unesterified abietic acid.

As illustrative of the production of, for example, ethyl abietate by the method and with the use of the apparatus in accordance with this invention, for example, a 25% solution of ethyl alcohol and rosin, having a molar ratio of 21 alcohol to 1 abietic acid is placed in the tank C, which, as has been indicated, is heated to increase the solubility of the rosin. The pump D is operated to draw solution from the tank C and force it through the heater E and reaction chambers A with delivery of the crude ester produced in the reaction chamber and excess alcohol into the cooler F under a pressure of about 800 pounds per square inch. In the heater E the solution is heated to a temperature of say, for example, about 265° C. and such is retained in the reaction chamber by suitable heating thereof, as by passing a heating fluid through jackets about the chambers. For the production of methyl abietate, for example, the above procedure may be followed using a temperature of about 280° C. and a pressure of about 2000 pounds per square inch.

As illustrative of the production of, for example, glycerol abietate, for example, a hot solution containing about 12% of glycerol and 88% of rosin, the molar relation being about 2 parts abietic acid to 1 glycerol is pumped through the reaction chamber A at a temperature of, for example, about 260° C. and under about atmospheric pressure, or if desired the temperature may be, for example, 280° C. and if desired may be carried out under a pressure of 50–70 cm. mercury. The glycerol crude abietate produced is withdrawn from the apparatus and refined as described above.

As illustrative of the production of a glycerol abietate, for example, an ethylene glycol-rosin solution in the molar proportion of 2 glycol to 15 rosin may be reacted in the apparatus at a temperature of about 250° C. and under a pressure of about 100 pounds per square inch.

In proceeding with the use of a polyhydric alcohol, as for example, glycerol, the reaction may be carried out if desired at pressures a little below atmospheric in order to facilitate the removal of water.

The reaction chambers are of such dimensions that their combined volume will be such that the required quantity of alcohol-rosin solution to give the desired type of ester occupies about 50% of the reaction chambers for, say, a period of thirty minutes. As illustrative, the three reaction chambers may have a diameter of, say about 8 inches and a height of about 8 feet and will have a combined value of 8.5 cubic feet.

Crude ester and excess alcohol are discharged from the cooler F through the pressure release valve H, into receiver I. The alcohol, which is in vapor form, passes from receiver I to condenser J in which it is condensed and flows into the receiver K from which it is withdrawn for use. The crude ester may be withdrawn from receiver I for use, or future refining, or it may be discharged from receiver I directly into a refining unit for effecting its refinement in any well known manner. The refining may involve, for example, distillation under reduced pressure in the presence of sufficient soda ash to neutralize unesterified abietic acid associated with the ester.

It will be appreciated that in the production of the esters by the method embodying this invention the above described procedure will be followed with such variation in temperature, pressure and time as may be necessary or desirable.

It will be understood that the temperature, pressure and time factors in the production of esters in accordance with this invention will depend upon the character of the alcohol used, its water content, the proportion of alcohol and abietic acid or rosin, the capacity of the reaction chambers, the time factor desired, etc, and that the temperature, pressure and time may be widely varied from the figures given generally and more specifically in the above description without departing from this invention.

It will be understood that in the practical adaptation of this invention the rosin used may be isomerized as by heat treatment, or it may be hydrogenated before esterification.

What I claim and desire to protect by Letters Patent is:

1. The method of producing an abietic acid ester which includes forcing a solution of abietic acid in an alcohol through a reaction chamber under a pressure and at a temperature such that esterification of abietic acid will be effected in the reaction chamber and separating the ester product and excess alcohol discharged from the reaction chamber.

2. The method of producing an abietic acid ester which includes forcing a solution of abietic acid in a monohydric aliphatic alcohol through a reaction chamber under a pressure and at a temperature such that esterification of abietic acid will be effected in the reaction chamber and separating the ester product and excess alcohol discharged from the reaction chamber.

3. The method of producing an abietic acid ester which includes forcing a solution of abietic acid in a polyhydric alcohol through a reaction chamber under a pressure and at a temperature such that esterification of abietic acid will be effected in the reaction chamber and separating the ester product and excess alcohol discharged from the reaction chamber.

4. The method of producing an abietic acid ester which includes forcing a solution of abietic acid in a monohydric aliphatic alcohol through a plurality of reaction chambers connected in series under a pressure and at a temperature such that esterification of abietic acid will be effected in the reaction chambers and separating the ester product and excess alcohol discharged from the reaction chambers.

5. The method of producing an abietic acid ester which includes forming a solution of rosin in an alcohol preheating the solution to a reactive temperature, forcing the heated solution through a reaction chamber under pressure while maintaining a reactive temperature therein and separating ester product and excess alcohol discharged from the reaction chamber.

6. The method of producing an abietic acid ester which includes forming a solution of rosin in a monohydric aliphatic alcohol, preheating the solution to a reactive temperature, forcing the heated solution through a reaction chamber under pressure while maintaining a reactive temperature therein and separating ester product and excess alcohol discharged from the reaction chamber.

7. The method of producing an abietic acid ester which includes forming a solution of rosin in a monohydric aliphatic alcohol, preheating the solution to a reactive temperature, forcing the heated solution through a plurality of reaction chambers connected in series under pressure while maintaining a reactive temperature therein and separating ester product and excess alcohol discharged from the reaction chambers.

8. The method of producing an abietic acid ester which includes forming a solution of rosin in a monohydric aliphatic alcohol, preheating the solution to a reactive temperature, forcing the heated solution through a reaction chamber under pressure while maintaining a reactive temperature therein, cooling the ester product and excess alcohol discharged from the reaction chamber and releasing the pressure on the ester product and excess alcohol.

9. The method of producing an abietic acid ester which includes forming a solution of rosin in a monohydric aliphatic alcohol, preheating the solution to a reactive temperature, forcing the heated solution through a reaction chamber under pressure while maintaining therein a temperature above the critical temperature of the alcohol and separating the ester product and excess alcohol discharged from the reaction chamber.

10. The method of producing an abietic acid ester which includes forming a solution of rosin in a monohydric aliphatic alcohol, preheating the solution to a reactive temperature, forcing the heated solution through a reaction chamber under pressure while maintaining therein a temperature above the critical temperature of the alcohol, cooling the ester product and excess alcohol discharged from the reaction chamber, releasing the pressure on ester product and excess alcohol, and separately condensing the alcohol.

11. The method of producing an abietic acid ester which includes forming a solution of rosin in a monohydric aliphatic alcohol in molar proportion of about 3 to about 25 alcohol to 1 rosin, preheating the solution to a reactive temperature, forcing the heated solution through a reaction chamber under pressure while maintaining a reactive temperature therein and separating ester product and excess alcohol discharged from the reaction chamber.

12. The method of producing an abietic acid ester which includes forming a solution of rosin in a monohydric aliphatic alcohol, preheating the solution to a reactive temperature, forcing the heated solution through a reaction chamber under pressure of about 200 to about 3500 pounds per square inch and at a temperature of about 250° C. to about 390° C., releasing the pressure on and separating ester product and excess alcohol discharged from the reaction chamber.

13. The method of producing an abietic acid ester which includes forming a solution of rosin in a monohydric aliphatic alcohol in molar proportion of about 3 to about 25 alcohol to 1 rosin, preheating the solution to a reactive temperature, forcing the heated solution through a reaction chamber under pressure of about 200 to about 3500 pounds per square inch and at a temperature of about 225° C. to about 390° C., releasing the pressure on and separating ester product and excess alcohol discharged from the reaction chamber.

14. The method of producing an abietic acid ester which includes forcing a solution of abietic acid in an alcohol through a plurality of reaction chambers connected in series under a pressure and at a temperature such that esterification of abietic acid will be effected in the reaction chambers and separating the ester product and excess alcohol discharged from the reaction chambers.

15. The method of producing an abietic acid ester which includes forcing a solution of abietic acid in a polyhydric alcohol through a plurality of reaction chambers connected in series under a pressure and at a temperature such that esterification of abietic acid will be effected in the reaction chambers and separating the ester product and excess alcohol discharged from the reaction chambers.

16. The method of producing an abietic acid ester which includes forcing a solution of abietic acid in ethyl alcohol through a reaction chamber under a pressure and at a temperature such that esterification of abietic acid will be effected in the reaction chamber and separating the ester product and excess alcohol discharged from the reaction chamber.

17. The method of producing an abietic acid ester which includes forcing a solution of abietic acid in methyl alcohol through a reaction chamber under a pressure and at a temperature such that esterification of abietic acid will be effected in the reaction chamber and separating the ester product and excess alcohol discharged from the reaction chamber.

18. The method of producing an abietic acid ester which includes forcing a solution of abietic acid in butyl alcohol through a reaction chamber under a pressure and at a temperature such that esterification of abietic acid will be effected in the reaction chamber and separating the ester product and excess alcohol discharged from the reaction chamber.

19. The method of producing an abietic acid ester which includes forming a solution of rosin in ethyl alcohol, forcing the solution through a reaction chamber under pressure while maintaining therein a temperature above the critical temperature of the alcohol and separating the ester product and excess alcohol discharged from the reaction chamber.

20. The method of producing an abietic acid ester which includes forming a solution of rosin in methyl alcohol, forcing the solution through a reaction chamber under pressure while maintaining therein a temperature above the critical temperature of the alcohol and separating the ester product and excess alcohol discharged from the reaction chamber.

21. The method of producing an abietic acid ester which includes forming a solution of rosin in butyl alcohol, forcing the solution through a reaction chamber under pressure while maintaining therein a temperature above the critical temperature of the alcohol and separating the ester product and excess alcohol discharged from the reaction chamber.

22. The method of producing an abietic acid ester which includes forming a solution of rosin in ethyl alcohol, forcing the solution through a reaction chamber under pressure of about 200 to about 3500 pounds per square inch and at a temperature of about 250° C. to about 390° C., releasing the pressure on the separating ester product and excess alcohol discharged from the reaction chamber.

23. The method of producing an abietic acid ester which includes forming a solution of rosin in methyl alcohol, forcing the solution through a reaction chamber under pressure of about 200 to about 3500 pounds per square inch and at a temperature of about 250° C. to about 390° C., releasing the pressure on the separating ester product and excess alcohol discharged from the reaction chamber.

24. The method of producing an abietic acid ester which includes forming a solution of rosin in butyl alcohol, forcing the solution through a reaction chamber under pressure of about 200 to about 3500 pounds per square inch and at a temperature of about 250° C. to about 390° C., releasing the pressure on the separating ester product and excess alcohol discharged from the reaction chamber.

25. The method of producing a hydrogenated abietic acid ester which includes forcing a solution of hydrogenated abietic acid in an alcohol through a reaction chamber under a pressure and at a temperature such that esterification of hydrogenated abietic acid will be effected in the reaction chamber and separating the ester product and excess alcohol discharged from the reaction chamber.

26. The method of producing a hydrogenated abietic acid ester which includes forming a solution of hydrogenated rosin in a monohydric aliphatic alcohol, forcing the solution through a reaction chamber under pressure while maintaining therein a temperature above the critical temperature of the alcohol and separating the ester product and excess alcohol discharged from the reaction chamber.

27. The method of producing a hydrogenated abietic acid ester which includes forming a solution of hydrogenated rosin in a monohydric aliphatic alcohol, forcing the solution through a reaction chamber under pressure of about 200 to about 3500 pounds per square inch and at a temperature of about 250° C. to about 390° C., releasing the pressure on and separating ester product and excess alcohol discharged from the reaction chamber.

28. The method of producing a hydrogenated abietic acid ester which includes forcing a solution of hydrogenated abietic acid in ethyl alcohol through a reaction chamber under a pressure and at a temperature such that esterification of hydrogenated abietic acid will be effected in the reaction chamber and separating the ester product and excess alcohol discharged from the reaction chamber.

29. The method of producing a hydrogenated abietic acid ester which includes forcing a solution of hydrogenated abietic acid in methyl alcohol through a reaction chamber under a pressure and at a temperature such that esterification of hydrogenated abietic acid will be effected in the reaction chamber and separating the ester product and excess alcohol discharged from the reaction chamber.

30. The method of producing a hydrogenated abietic acid ester which includes forcing a solution of hydrogenated abietic acid in butyl alcohol through a reaction chamber under a pressure and at a temperature such that esterification of hydrogenated abietic acid will be effected in the reaction chamber and separating the ester product and excess alcohol discharged from the reaction chamber.

DURAIN C. BUTTS.